United States Patent
Wahl et al.

(10) Patent No.: US 8,088,025 B2
(45) Date of Patent: Jan. 3, 2012

(54) GOLF CLUB HEAD

(75) Inventors: Bret H. Wahl, Escondido, CA (US);
Peter L. Larsen, San Marcos, CA (US);
Loren Stowe, Oceanside, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 229 days.

(21) Appl. No.: 12/462,198

(22) Filed: Jul. 29, 2009

(65) Prior Publication Data

US 2011/0028240 A1   Feb. 3, 2011

(51) Int. Cl.
*A63B 53/04* (2006.01)

(52) U.S. Cl. .................. 473/346; 473/345

(58) Field of Classification Search .......... 473/345, 473/346

See application file for complete search history.

(56) References Cited

U.S. PATENT DOCUMENTS

| | | | |
|---|---|---|---|
| 4,523,759 A | 6/1985 | Igarashi | |
| 5,007,643 A | 4/1991 | Okumoto et al. | |
| 5,104,123 A * | 4/1992 | Okitsu et al. | 473/520 |
| 5,135,227 A | 8/1992 | Okumoto et al. | |
| 5,277,423 A | 1/1994 | Artus | |
| 5,348,302 A | 9/1994 | Sasamoto et al. | |
| 5,465,969 A | 11/1995 | Cadorniga | |
| 5,499,819 A | 3/1996 | Nagamoto | |
| 5,529,543 A | 6/1996 | Beaumont, Sr. | |
| 5,649,873 A * | 7/1997 | Fuller | 473/332 |
| 5,697,855 A | 12/1997 | Aizawa | |
| 5,766,092 A * | 6/1998 | Mimeur et al. | 473/329 |
| 6,306,048 B1 * | 10/2001 | McCabe et al. | 473/333 |
| 6,743,117 B2 | 6/2004 | Gilbert | |
| 6,835,144 B2 | 12/2004 | Best | |
| 6,918,840 B2 | 7/2005 | Stites et al. | |
| 6,921,343 B2 | 7/2005 | Solheim | |
| 6,921,344 B2 | 7/2005 | Gilbert et al. | |
| 6,923,732 B2 | 8/2005 | Stites et al. | |
| 6,991,559 B2 | 1/2006 | Yabu | |
| 7,022,029 B2 * | 4/2006 | Caldwell | 473/324 |
| 7,147,571 B2 | 12/2006 | Best et al. | |
| 7,207,899 B2 | 4/2007 | Imamoto | |
| 7,232,377 B2 | 6/2007 | Gilbert et al. | |
| 7,300,361 B2 | 11/2007 | Stites et al. | |
| 7,303,486 B2 | 12/2007 | Imamoto | |
| 7,316,623 B2 | 1/2008 | Imamoto | |
| 7,476,162 B2 | 1/2009 | Stites et al. | |
| 7,481,719 B2 | 1/2009 | Imamoto | |
| 2005/0075191 A1 | 4/2005 | Bennett | |
| 2007/0049417 A1 | 3/2007 | Shear | |

(Continued)

FOREIGN PATENT DOCUMENTS

JP   4109973   4/1992

(Continued)

*Primary Examiner* — Gene Kim
*Assistant Examiner* — Michael Dennis
(74) *Attorney, Agent, or Firm* — Klarquist Sparkman, LLP

(57) ABSTRACT

An iron-type golf club head is disclosed having a heel portion, a sole portion, a toe portion, a top-line portion, a front portion, a rear portion, and a striking face. A back wall is also disclosed in the rear portion enclosing a portion of the rear portion to create an enclosed cavity. The cavity is defined by at least a rear surface of the striking face, an inner back wall surface, and the sole portion. A plug and a filler material is located within the enclosed cavity. The filler material surrounds the plug and is configured to hold the plug in place. The plug is lighter than the filler material.

23 Claims, 9 Drawing Sheets

U.S. PATENT DOCUMENTS

| | | |
|---|---|---|
| 2007/0129162 A1 | 6/2007 | Pan et al. |
| 2007/0129166 A1 | 6/2007 | Shimazaki et al. |
| 2007/0155533 A1* | 7/2007 | Solheim et al. ............... 473/334 |
| 2008/0004134 A1 | 1/2008 | Roach et al. |
| 2008/0032813 A1 | 2/2008 | Hagood et al. |
| 2008/0032815 A1 | 2/2008 | Yamamoto |
| 2008/0058117 A1 | 3/2008 | Roach |

FOREIGN PATENT DOCUMENTS

| | | |
|---|---|---|
| JP | 9117537 | 5/1997 |
| JP | 2005-218510 | 8/2005 |
| JP | 2006-167033 | 6/2006 |
| WO | WO 2006/017605 | 2/2006 |

* cited by examiner

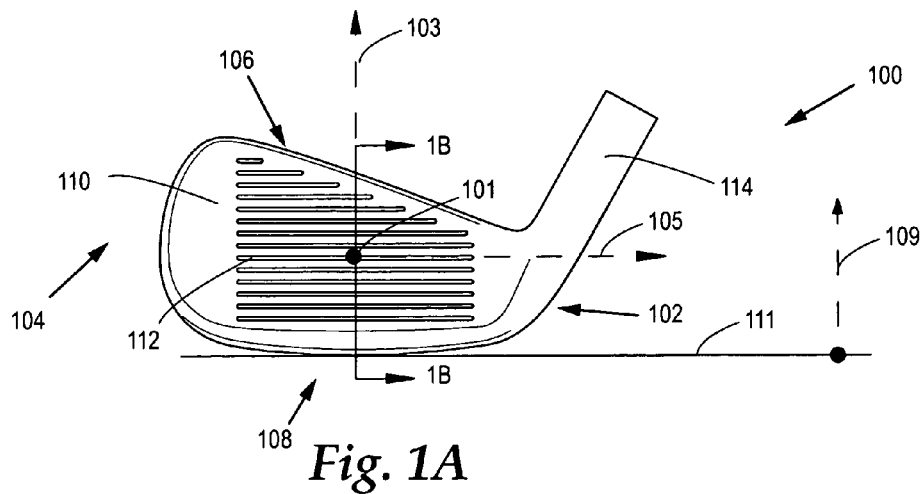
Fig. 1A
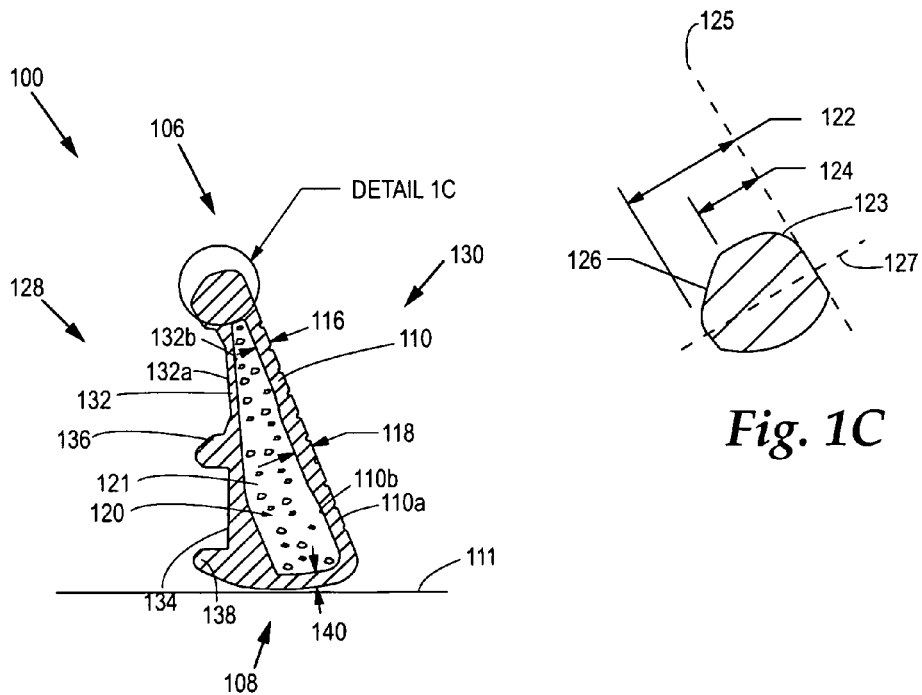
Fig. 1C
Fig. 1B

GOLF CLUB HEAD

FIELD

The present disclosure relates to a golf club head. More specifically, the present disclosure relates to a golf club head filled with a dampening material.

BACKGROUND

A golf set includes various types of clubs for use in different conditions or circumstances in which a ball is hit during a golf game. A set of clubs typically includes a "driver" for hitting the ball the longest distance on a course. A fairway "wood" can be used for hitting the ball shorter distances than the driver. A set of irons are used for hitting the ball within a range of distances typically shorter than the driver or woods.

An iron has a flat face that normally contacts the ball whenever the ball is being hit with the iron. Irons have angled faces for achieving lofts ranging from about 18 degrees to about 60 degrees.

Every club has a "sweet spot" that represents the best hitting zone on the face for maximizing the probability of the golfer achieving the best and most predictable shot using the particular club. Most golfers strive to make contact with the ball inside the sweet spot to achieve a desired trajectory. However, a golf club head may have a tendency to cause undesirable sounds and vibrations upon impact.

SUMMARY OF THE DESCRIPTION

The present disclosure describes a golf club head comprising a heel portion, a toe portion, a crown, a sole, and a face.

The foregoing and other objects, features, and advantages of the invention will become more apparent from the following detailed description, which proceeds with reference to the accompanying figures.

According to one aspect of an embodiment of the present invention, a hollow iron-type golf club head is described including a heel portion, a sole portion, a toe portion, a topline portion, a front portion, a rear portion, and a striking face. A back wall is located in the rear portion enclosing a substantial portion of the rear portion to create a substantially enclosed cavity. The enclosed cavity is defined by at least a rear surface of the striking face, an inner back wall surface, and the sole portion. At least one plug and a filler material located within the enclosed cavity are described. The filler material substantially surrounding the plug and is configured to hold the at least one plug in place.

In one example, the enclosed cavity has a volume between about 1 cc and 200 cc and an unsupported face area between about 300 mm$^2$ to about 4,000 mm$^2$ is described.

In another example, the unsupported face area includes a thickened central region and the plug is positioned to be in contact with at least a portion of the thickened central region. The at least one plug contacts the inner back wall surface.

In yet another example, the striking face includes a welded striking plate and a total striking face area is between about 2,700 mm$^2$ and 5,000 mm$^2$.

In one example, an aperture into the enclosed cavity is provided for filling the cavity with the filler material. The filler material is an expanding foam material having a density between about 0.03 g/cc and about 0.19 g/cc.

In another example, the filler material occupies about 50% to about 99% of the total enclosed cavity volume. The filler material completely fills a remaining cavity volume around the at least one plug. The filler material contacts an entire first side surface of the at least one plug.

In yet another example, the filler material and the at least one plug have a combined weight of less than about 10 g or about 5 g.

In one example, the filler material and plug have a combined weight of less than about 20% of the total club head weight, or less than about 5%.

In another example, the back wall includes a first aperture having at least a first diameter and a slot configured to match at least a keying portion of the at least one plug and the coefficient of restitution of the club is greater than about 0.8.

In yet another example, the striking face includes a striking plate formed of a steel, such as maraging steels, maraging stainless steels, and PH stainless steels.

In one example, the plug is in direct contact with a rear surface of the striking face and at least a portion of the filler material is in direct contact with a rear surface of the striking face.

In another example, the back wall includes at least a first aperture. The first aperture is configured to allow the at least one plug to be inserted into the first aperture and is configured to allow the at least one plug to move from a first position to a second position.

In yet another example, the back wall includes at least one slot, the at least one slot being connected to the first aperture and is configured to secure the at least one plug.

According to one aspect of one embodiment of the present invention, a method of manufacturing a hollow iron-type golf club with a plug and filler material is described. A body including a heel portion, a sole portion, a toe portion, a topline portion, a front portion, and a rear portion having a back wall is disclosed. An aperture is formed on the body. A striking face is formed and attached to the front portion of the body to form a cavity defined by a rear surface of the striking face, an inner surface of the back wall, and the sole portion. At least one plug is inserted into the aperture. The at least one plug is in direct contact with the rear surface of the striking face and the inner surface of the back wall. The plug is moved from a first position to a second position. A filler material is inserted into the aperture. The filler material substantially surrounds the plug and is configured to hold the plug in place. The aperture is covered with a badge in the rear portion of the body.

BRIEF DESCRIPTION OF THE DRAWINGS

The present invention is illustrated by way of example and not limitation in the figures of the accompanying drawings in which like references indicate similar elements.

FIG. 1A is a front view of an embodiment of a golf club head.

FIG. 1B is a cross-sectional view taken along section lines 1B-1B in FIG. 1A.

FIG. 1C is a magnified view of DETAIL 1C in FIG. 1B.

DETAILED DESCRIPTION

Figure 1D:
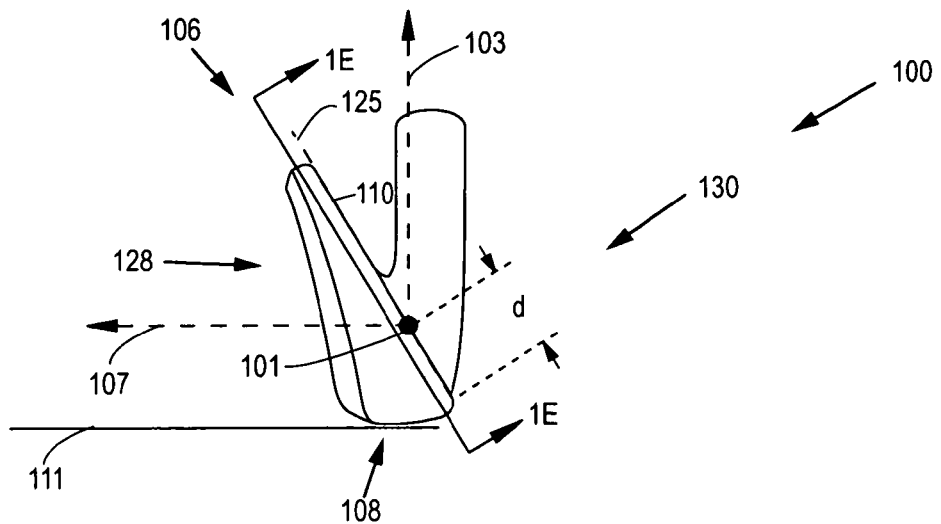
FIG. 1D is an elevated toe perspective view of a golf club head.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

FIG. 1A illustrates a hollow iron golf club head 100 including a heel 102, toe 104, sole portion 108, and top line portion 106. The striking face 110 includes grooves 112 that are designed for impact with the golf ball. In some embodiments, the golf club head 100 can be a single unitary cast piece, while in other embodiments, a striking plate can be formed separately to be adhesively or mechanically attached to the golf club head 100.

FIGS. 1A and 1D also show a center point 101 being an ideal striking point in the center of the striking face 110 and respective orthogonal CG axes. A CG x-axis 105, CG y-axis 107, and CG z-axis 103 intersect at the center point 101. In addition, a CG z-up axis 109 is defined as an axis perpendicular to the ground plane 111 and having an origin at the ground plane 111. The ground plane 111 is assumed to be a perfectly flat plane.

In certain embodiments, a desirable CG-x location is between about 5 mm (heel side) and about −5 mm (toe side) along the CG x-axis 105. A desirable CG-y location is between about 0.25 mm to about 20 mm along the CG y-axis 107 toward the rear portion of the club head. Additionally, a desirable CG-z location is between about 12 mm to about 25 mm along the CG z-up axis 109, as previously described.

FIG. 1B shows a cross sectional side view of the hollow iron golf club head 100 along the cross-section lines 1B-1B shown in FIG. 1A. The cross-section lines 1B-1B are taken through an ideal striking point 101 in the center of the striking face 110. The ideal striking point 101 is located in a striking face plane 125 at the intersection of a first axis (within the face plane 125) passing through the midpoint of the longest scoreline groove and a second horizontal axis (within the face plane 125) offset from the leading edge (defined as the intersection of the sole portion and the face plane 125) by a distance d of about 16.5 mm within the face plane 125, as shown in FIG. 1D. The striking face 110 includes a front surface 110a and a rear surface 110b. The hollow iron golf club head 100 further includes a back portion 128 and a front portion 130. The striking face 110 located in the front portion 130 has an inverted cone profile or thickened central region that provides multiple thicknesses across the striking face 110. The thickened central region can be a variety of profile shapes and is not restricted to a cone shape.

The striking face 110 has a first thickness 116 and a second thickness 118. The second thickness is greater than the first thickness 116. In certain embodiments, the first thickness 116 can be between about 1.5 mm and about 2.5 mm, with a preferred thickness of about 2 mm or less. The second thickness 118 can be between about 1.7 mm and about 2.5 mm or less than about 2.7 mm. Furthermore, the sole portion 108 has a sole thickness dimension 140 that extends within a region between a rear protrusion 138 and the striking face 110. In certain embodiments, the sole thickness dimension 140 is between about 1 mm and about 2 mm, or less than about 2 mm. In one embodiment, a preferred sole thickness 140 is about 1.8 mm or less. A recess 134 is located above the rear protrusion 138 in the back portion 128 of the club head. A back wall 132 encloses the entire back portion 128 of the club head to define a cavity 120 that is primarily filled with a filler material 121.

In one embodiment, the filler material 121 can be an expandable foam such as Expancel® 920 DU 40 which is an acrylic copolymer encapsulating a blowing agent, such as isopentane. A copolymer is greater than about 75 weight percent of the composition and the blowing agent is about 15-20 weight percent. The unexpanded particle size of the filler material 121 can be between about 2 μm and about 90 μm depending on the context.

In one embodiment, the density of the filler material 121 is between about 0.16 g/cc and about 0.19 g/cc or between about 0.03 g/cc and about 0.19 g/cc. In certain embodiments, the density of the filler material 121 is in the range of about 0.03 g/cc to about 0.2 g/cc, or about 0.04-0.10 g/cc. The density of the filler material 121 impacts the COR, durability, strength, and filling capacity of the club head. In general, a lower density material will have less of an impact on the COR of a club head. The filler material 121 can have a hardness range of about 15-85 Shore OO hardness or about 80 Shore OO hardness or less.

In one embodiment, the filler material 121 is subject to heat for expansion of about 150° C.+/−10° C. for about 30 minutes. In some embodiments, the expansion of the filler material 121 can begin at about 125° C. to about 140° C. A maximum expansion temperature range can be between about 160° C. to about 190° C. The temperature at which the expansion of the filler material 121 begins is critical in preventing unwanted expansion after the club head is assembled. For example, a filler material that begins expanding at about 120° C. will not cause unwanted expansion when the club is placed in the trunk of a car (where temperatures can reach up to about 83° C.). Thus, a filler material 121 that has a beginning expansion temperature of greater than about 80° C. is preferred.

Some other examples of materials that can be used as a filler material or plug material include, without limitation: viscoelastic elastomers; vinyl copolymers with or without inorganic fillers; polyvinyl acetate with or without mineral fillers such as barium sulfate; acrylics; polyesters; polyurethanes; polyethers; polyamides; polybutadienes; polystyrenes; polyisoprenes; polyethylenes; polyolefins; styrene/isoprene block copolymers; metallized polyesters; metallized acrylics; epoxies; epoxy and graphite composites; natural and synthetic rubbers; piezoelectric ceramics; thermoset and thermoplastic rubbers; foamed polymers; ionomers; low-density fiber glass; bitumen; silicone; and mixtures thereof. The metallized polyesters and acrylics can comprise aluminum as the metal. Commercially available materials include resilient polymeric materials such as Scotchdamp™ from 3M, Sorbothane® from Sorbothane, Inc., DYAD® and GP® from Soundcoat Company Inc., Dynamat® from Dynamat Control of North America, Inc., NoViFlex™ Sylomer® from Pole Star Maritime Group, LLC, Isoplast® from The Dow Chemical Company, and Legetolex™ from Piqua Technologies, Inc. In one embodiment the filler material may have a modulus of elasticity ranging from about 0.001 GPa to about 25 GPa, and a durometer ranging from about 5 to about 95 on a Shore D scale. In other examples, gels or liquids can be used, and softer materials which are better characterized on a Shore A or other scale can be used. The Shore D hardness on a polymer is measured in accordance with the ASTM (American Society for Testing and Materials) test D2240.

FIG. 1B further shows an optional ridge 136 extending across a portion of the outer back wall surface 132a forming an upper concavity and a lower concavity. An inner back wall surface 132b defines a portion of the cavity 120 and forms a thickness between the outer back wall surface 132a and the inner back wall surface 132b. In some embodiments, the back wall thickness varies between a thickness of about 1 mm to about 3 mm.

FIG. 1C is a magnified view of the top line 106 DETAIL 1C shown in FIG. 1B. FIG. 1C shows the top line 106 and a striking plane 125 that is parallel to and contains the front striking surface 110. A second plane 127 is shown being perpendicular to the striking plane 125 and the striking surface 110. The top line 106 includes a return surface 123 immediately adjacent to the striking face 110 in the top line portion 106. The return surface 123 extends from the striking face 110 toward the back portion 128 and a majority of the return surface 123 is generally parallel with the second plane 127. A transition surface 126 connects the return surface 123 to the outer back wall surface 132a.

In certain embodiments, the return surface 123 extends from the striking face 110 a return distance 124 (or "effective top line thickness") of between about 3.5 mm and 5 mm, or about 4.8 mm or less, as measured along the second plane 127 and perpendicular to the striking plane 125. In some embodiments, the return surface 123 extends less than 60% of the total top line thickness 122. In certain embodiments, the total top line thickness 122 is between about 6 mm and about 9 mm, or about 8.5 mm or less, as measured along the second plane 127 and perpendicular to the striking plane 125.

A small effective top line thickness 124 of the return surface 123 creates the perception to a golfer that the entire top line 106 of the club head 100 is thin. A perceived thin top line 106 can enhance the aesthetic appeal to a golf player.

FIG. 1D illustrates an elevated toe view of the golf club head 100 including a back portion 128, a front portion 130, a sole portion 108, a top line portion 106, and a striking face 110, as previously described.

Figure 1E:
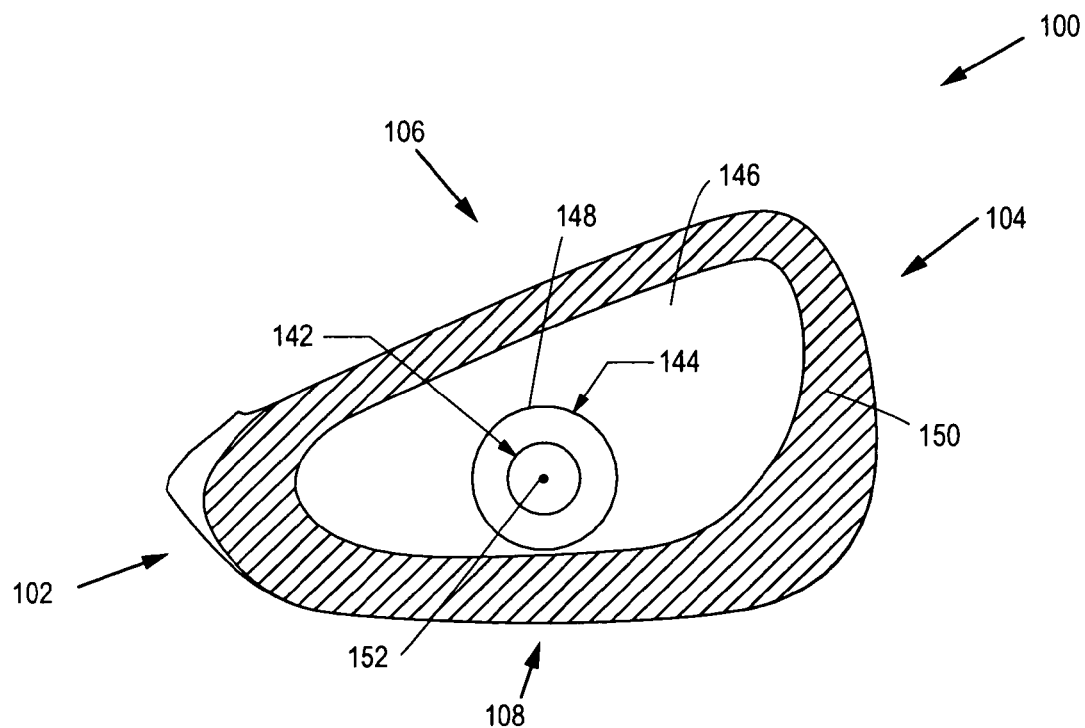
FIG. 1E is a cross-sectional view taken along section lines 1E-1E in FIG. 1D.

FIG. 1E illustrates a cross-sectional view taken along cross-sectional lines 1E-1E of FIG. 1D. FIG. 1E shows a rear unsupported face region 146, an inverted cone technology region 148 (hereinafter, "ICT region" or "Thickened Central Region") and a rear supported face region 150. The unsupported face region 146 is a region of the striking face 110 where the thickness of the face is thin (i.e. less than about 3 mm or less than about 5 mm) and is not supported by any separate or integrated metallic structure having a significant impact on the stiffness of the striking face 110. The ICT region 148 can be considered a sweet spot where an ideal impact can occur at the center point 152 of the ICT. Variable thickness configurations or inverted cone configurations are discussed in, for example, U.S. Pat. Nos. 6,800,038, 6,824,475, 6,904,663, and 6,997,820, all incorporated herein by reference.

The rear supported face region 150 is located about a periphery of the unsupported face region 146. The inverted cone region 148 is centered about an ideal impact location 152 located in a central location of the unsupported face region 146. The inverted cone region 148 includes an outer span 144 and an inner span 142. In some embodiments, the outer span 144 is between about 15 mm and about 25 mm, or at least 20 mm. The inner span 142 of the inverted cone region 148 represents the thickest portion of the unsupported face region 146. In certain embodiments, the inner diameter 142 is between about 5 mm and about 15 mm, or at least about 10 mm.

The tabulated values in Tables 1-7 are total face area, thin face thickness, thickened central region (or ICT region area), and the unsupported surface area.

The "total face area" is defined as the area of face contained within a face plane on a front striking portion of the club head. The "thin face thickness" is the nominal thickness of the striking surface in its thinnest location (such as dimension 116, in FIG. 1B). The ICT region 148 area is the surface area contained by the variable thickness region or inverted cone area. Furthermore, the "Unsupported Surface Area" is the unsupported rear surface area 146 of the striking face (including an ICT region 148).

EXAMPLE 1

TABLE 1

| Club head | Total Face Area (mm$^2$) | Thin Face Thickness (mm) | Thickened Central Region Area (mm$^2$) | Unsupported Surface Area (mm$^2$) |
|---|---|---|---|---|
| 3-iron | 2,825 | 2.1 | 541 | 2,175 |
| 6-iron | 2,964 | 2.1 | 541 | 2,276 |
| 9-iron | 3,116 | 2.1 | 541 | 2,094 |
| Wedge | 3,452 | 2.1 | 541 | 2,345 |

EXAMPLE 2

TABLE 2

| Club head | Total Face Area (mm$^2$) | Thin Face Thickness (mm) | ICT Region (mm$^2$) | Unsupported Surface Area (mm$^2$) |
|---|---|---|---|---|
| 3-iron | 2,824 | 2.4 | 527 | 2,403 |
| 6-iron | 2,962 | 2.4 | 527 | 2,473 |
| 9-iron | 3,113 | 2.4 | 527 | 2,245 |
| Wedge | 3,451 | 2.4 | 527 | 2,540 |

EXAMPLE 3

TABLE 3

| Club head | Total Face Area (mm$^2$) | Thin Face Thickness (mm) | ICT Region (mm$^2$) | Unsupported Surface Area (mm$^2$) |
|---|---|---|---|---|
| 3-iron | 2,792 | 2.5 | 388 | 1,631 |
| 6-iron | 2,965 | 2.5 | 388 | 1,608 |
| 9-iron | 3,151 | 2.5 | 388 | 1,597 |
| Wedge | 3,304 | 2.5 | 388 | 1,519 |

EXAMPLE 4

TABLE 4

| Club head | Total Face Area (mm²) | Thin Face Thickness (mm) | ICT Region (mm²) | Unsupported Surface Area (mm²) |
|---|---|---|---|---|
| 3-iron | 2,796 | 2.2 | 247 | 1,560 |
| 6-iron | 2,934 | 2.2 | 247 | 1,529 |
| 9-iron | 3,084 | 2.4 | 247 | 1,479 |
| Wedge | 3,421 | 2.4 | 247 | 1,711 |

EXAMPLE 5

TABLE 5

| Club head | Total Face Area (mm²) | Thin Face Thickness (mm) | ICT Region (mm²) | Unsupported Surface Area (mm²) |
|---|---|---|---|---|
| 3-iron | 2,763 | 2.4 | 314 | 2,220 |
| 6-iron | 2,974 | 2.4 | 314 | 2,206 |
| 9-iron | 3,376 | 2.4 | 314 | 2,240 |
| Wedge | 3,421 | 2.4 | 314 | 2,055 |

EXAMPLE 6

TABLE 6

| Club head | Total Face Area (mm²) | Thin Face Thickness (mm) | ICT Region (mm²) | Unsupported Surface Area (mm²) |
|---|---|---|---|---|
| 3-iron | 2,790 | 2.5 | 239 | 1,567 |
| 6-iron | 2,958 | 2.5 | 292 | 1,719 |
| 9-iron | 3,150 | 2.5 | 308 | 1,621 |
| Wedge | 3,301 | 2.5 | 313 | 1,627 |

EXAMPLE 7

TABLE 7

| Club head | Total Face Area (mm²) | Thin Face Thickness (mm) | ICT Region (mm²) | Unsupported Surface Area (mm²) |
|---|---|---|---|---|
| 3-iron | 3,177 | 2.0 | 700 | 3,175 |
| 6-iron | 3,231 | 2.0 | 700 | 3,260 |
| 9-iron | 3,384 | 2.0 | 315 | 2,244 |
| Wedge | 3,436 | 2.0 | 315 | 2,104 |

The tabulated values are representative and other configurations can be provided as described herein. It should be noted, in the above examples, one advantage of the Unsupported Surface Area is that a mass savings is achieved while also providing a durable and high COR striking face.

In the examples provided in Tables 1-7, a total face area can be in a range of about 2,700 mm² to about 4,000 mm². The Unsupported Surface Area can be within a range of about 300 mm² to about 4,000 mm², or preferably 450 mm² to about 3,500 mm². In some embodiments, the Unsupported Surface Area is at least greater than about 2,000 mm². The thin face thickness can be within a range of about 1.0 mm-3.0 mm, preferably 1.5-2.5 mm, and also preferably in a range of about 1.6-2.0 mm. In certain embodiments, the thin face thickness is less than about 2.0 mm. In embodiments having an ICT region, the ICT region surface area can range from about 230 mm² to about 2,000 mm².

Figure 2A:
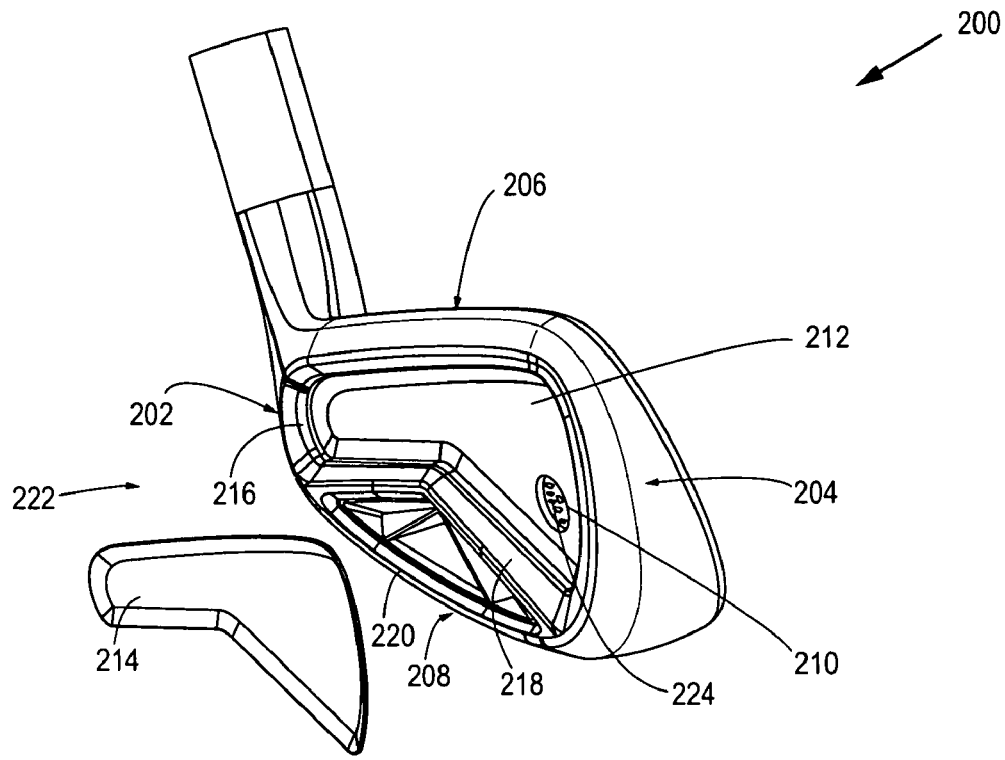
FIG. 2A is an exploded assembly view of a golf club head according to an embodiment.

FIG. 2A illustrates one embodiment of a hollow iron golf club head 200 having a top line portion 206, a toe portion 204, a heel portion 202, a rear portion 222, and a sole portion 208. The golf club head 200 includes a back wall 212 located within a cavity region 216 or recess in the rear portion 222 of the club head 200. The cavity region 216 includes side walls around a periphery of the back wall 212 creating a first recess or cavity region 216 where a badge 214 can be inserted and adhesively attached to the back wall 212. An aperture 210 is located in the back wall 212 and can be used for filling the hollow iron 200 with a sound dampening filler material 224 as previously described. A second recess 220 is located below the first recess 216 and can also be configured to receive a second badge.

After the hollow iron 200 is filled with the filler material 224, the badge 214 is adhesively or mechanically attached to the back wall 212 to cover or occlude the aperture 210 to prevent filler material from leaving the cavity and also to achieve a desired aesthetic and further dampening.

Figure 2B:
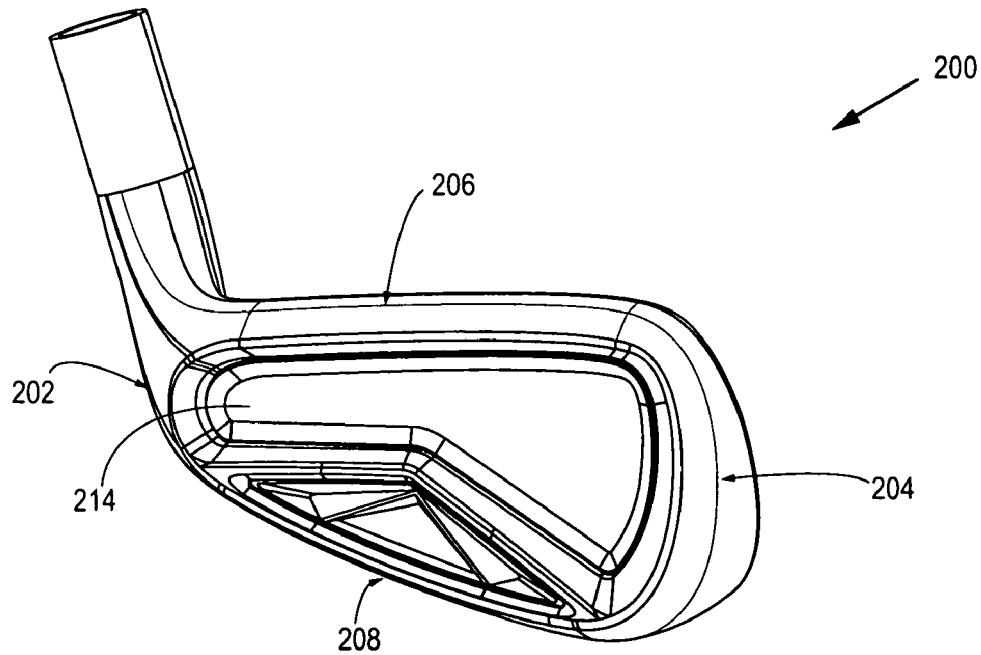
FIG. 2B is an assembled view of a golf club head according to an embodiment.

FIG. 2B shows the golf club head 200 fully assembled after the filler material 224 is inserted and the badge 214 is attached to the back wall 212.

Figure 3A:
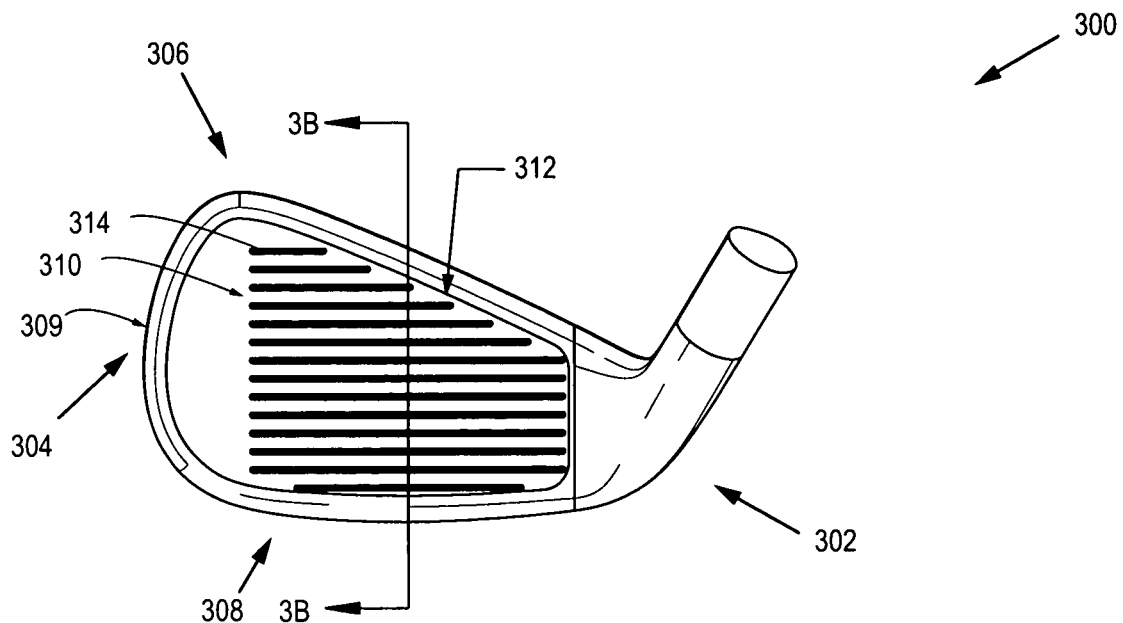
FIG. 3A is a front view of another embodiment of a golf club head.

FIG. 3A illustrates another embodiment of a golf club head 300 including a heel portion 302, a toe portion 304, a top line portion 306, a sole portion 308, a body portion 309 and a striking plate 310 located on a striking surface. The striking plate 310 includes grooves 314.

In one embodiment, the striking plate 310 is mechanically attached to a front portion of the body portion 309. Specifically, a weld line 312 is formed about a periphery of the striking plate 310.

The weld is created by a welding device, such as a laser or plasma weld. In one embodiment, the weld is applied on the front face of the golf club head 300 from a frontward to rearward direction. The weld can be any type of weld including (but not limited to) bead, groove, fillet, surfacing, tack, plug, slot, friction, and resistance welds.

Compared to TIG welding and other welding techniques, laser welding can be advantageous by concentrating more energy at the weld site. Laser welding also produces a smaller heat affected zone and more localized melt, less material interdiffusion, and reduced material fatigue during subsequent use.

After completion of the welding, the club head is subjected to a heat treatment for aging. The post-weld heat treatment is generally at 480-540° C. for four hours. The club head is also machine finished as required, such as grinding, polishing, or sandblasting, to smooth and topologically blend the surface of the weldment into the face plane. Finish machining is desirably followed by passivation. After completing finish-machining, it may be desirable to apply a suitable surface treatment of the club head, such as plating, painting, coating, or the like. Plating may be performed to produce a surface plating layer that protects against corrosion and is strong, durable, relatively inert, and aesthetically pleasing. Exemplary materials for forming a plating layer are Cr, Ni, and Cu. Exemplary techniques for forming the plating layer are electrode plating, electroless plating, physical vapor deposition (PVD), chemical vapor deposition (CVD), ion plating, and ion-beam-enhanced diffusion. An intermediate sublayer can be applied prior to the plating layer such as soft nickel, soft copper, and oxides.

In some embodiments, the COR is greater than 0.790. Preferably, the COR is at least 0.80 as measured according to the USGA Rules of Golf based on a 160 ft./s ball speed test and the USGA calibration plate. The COR can even be as high as 0.83.

In certain embodiments, the striking plate 310 can be formed of forged maraging steel, maraging stainless steel, or precipitation-hardened (PH) stainless steel. In general, maraging steels have high strength, toughness, and malleability. Being low in carbon, they derive their strength from precipitation of inter-metallic substances other than carbon. The principle alloying element is nickel (15% to nearly 30%). Other alloying elements producing inter-metallic precipitates in these steels include cobalt, molybdenum, and titanium. In one embodiment, the maraging steel contains 18% nickel. Maraging stainless steels have less nickel than maraging steels but include significant chromium to inhibit rust. The chromium augments hardenability despite the reduced nickel content, which ensures the steel can transform to martensite when appropriately heat-treated. In another embodiment, a maraging stainless steel C455 is utilized as the striking plate. In other embodiments, the striking plate is a precipitation hardened stainless steel such as 17-4, 15-5, or 17-7.

The striking plate can be forged by hot press forging using any of the described materials in a progressive series of dies. After forging, the striking plate is subjected to heat-treatment. For example, 17-4 PH stainless steel forgings are heat treated by 1040° C. for 90 minutes and then solution quenched. In another example, C455 or C450 stainless steel forgings are solution heat-treated at 830° C. for 90 minutes and then quenched.

In one embodiment, the body portion 309 is made from 17-4 steel. However another material such as carbon steel (e.g., 1020, 1030, 8620, or 1040 carbon steel), chrome-molybdenum steel (e.g., 4140 Cr—Mo steel), Ni—Cr—Mo steel (e.g., 8620 Ni—Cr—Mo steel), austenitic stainless steel (e.g., 304, N50, or N60 stainless steel (e.g., 410 stainless steel) can be used.

The components of the described components disclosed in the present specification can be formed from any of various suitable metals or metal alloys.

In addition to those noted above, some examples of metals and metal alloys that can be used to form the components of the parts described include, without limitation: titanium alloys (e.g., 3-2.5, 6-4, SP700, 15-3-3-3, 10-2-3, or other alpha/near alpha, alpha-beta, and beta/near beta titanium alloys), aluminum/aluminum alloys (e.g., 3000 series alloys, 5000 series alloys, 6000 series alloys, such as 6061-T6, and 7000 series alloys, such as 7075), magnesium alloys, copper alloys, and nickel alloys.

The body portion 309 can include various features such as weighting elements, cartridges, and/or inserts or applied bodies as used for CG placement, vibration control or damping, or acoustic control or damping. For example, U.S. Pat. No. 6,811,496, incorporated herein by reference in its entirety, discloses the attachment of mass altering pins or cartridge weighting elements.

After forming striking plate 310 and the body portion 309, the striking plate 310 and body portion 309 contact surfaces can be finish-machined to ensure a good interface contact surface is provided prior to welding. In one embodiment, the contact surfaces are planar for ease of finish machining and engagement.

The thickness profiles and low thickness values of the striking plate can be achieved during the forging of the striking plate. In one embodiment, a 0.3 mm to 1.0 mm machine stock plate can be added to the striking plate to increase tolerance control. After forging, the striking plate can be slightly milled and engraved with score-lines. A key advantage of being able to forge such a thin face is the freeing up of discretionary mass (up to about 20 g) that can be placed elsewhere in the club head (such as the rear piece) for manipulation of the moment of inertia or center of gravity location.

The thickness of the striking plate in the thin face area is generally consistent in thickness and non-variable. Of course, manufacturing tolerances may cause some variation in the thin face area. The thin face area and the ICT region can be considered the "unsupported" face area of the striking face because the thickness dimensions are relatively thin in those areas. In certain embodiments, the thin face area is about 50% or more of the unsupported surface area.

Figure 3B:
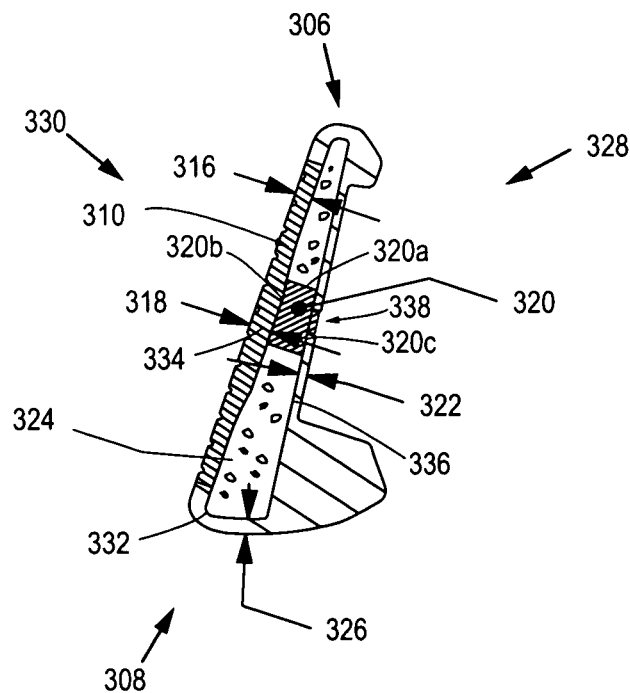
FIG. 3B is a cross-sectional view taken along section lines 3B-3B in FIG. 3A.

FIG. 3B illustrates a cross-sectional view taken along cross section lines 3B-3B shown in FIG. 3A. FIG. 3B further shows the front portion 330 and the back portion 328 in addition to the sole portion 308 and top line portion 306. The welded striking plate 310 includes a thickened central region 334, a first thickness 316, and a second thickness 318 as previously described. The sole portion 308 includes a minimum sole thickness 326 of about 2 mm or less, or with in the ranges described herein, such as about 1 mm to about 2 mm or less than 3 mm.

A filler material 324 fills an entire interior cavity 332 and surrounds a plug 320 located near or at least in partial contact with the thickened central region 334. It is understood that more than one plug 320 can be provided. In certain embodiments, a plurality of plugs such as two, three, or four plugs can be used. The plug 320 includes a first surface (or first side surface) 320a contacting the filler material 324. The filler material 324 directly contacts the entire first surface 320a to hold and prevent the plug 320 from shifting out of position. In other words, the filler material 324 completely surrounds the plug 320 within a plane parallel to the striking plate 310. A second surface 320b of the plug 320 directly contacts at least a portion of the inverted cone region or thickened region 334 of the striking plate 310. Furthermore, a third surface 320c of the plug 320 directly contacts at least a portion of a back wall 336. In other words, the filler material 324 does not surround the plug 320 within a plane perpendicular to the striking plate 310. The back wall 336 includes an inner back wall and an outer back wall having certain dimensional thicknesses as previously described.

An aperture 338 is located in the back wall 336 to allow the plug 320 to be inserted into the fully enclosed cavity 332. Upon insertion through the aperture 338, the plug is compressed slightly so that a frictional engagement occurs between the second surface 320b of the plug and the rear surface of the striking plate 310. In addition, a frictional engagement also occurs between the third surface 320c of the plug and a portion of the back wall 336. Optionally, the aperture 338 can be located anywhere on the club head body surface other than the front striking face. For example, the aperture 338 can be located on the sole, toe, heel, or top line surfaces.

After the plug 320 is frictionally engaged in a position, the filler material 324 can be inserted into the cavity 332. In certain embodiments, the plug 320 is a polymeric material.

In one embodiment, the plug 320 material is a urethane or silicone material having a density of about 0.95 g/cc to about 1.75 g/cc, or about 1 g/cc. The plug 320 can have a hardness of about 10 to about 70 shore A hardness. In certain embodiments, a shore A hardness of about 40 or less is preferred. In certain embodiments, a shore D hardness of up to about 40 or less is preferred.

The filler material 324 can be an expanding foam material that is expanded by a certain amount of heat as previously described. The filler material 324 expands and fills a relatively large volume, greater than the volume occupied by the plug 320. In some embodiments, the volume of the cavity 332 is between about 1 cc and about 200 cc, or preferably between about 10 cc and about 20 cc. For the purposes of measuring the cavity 332 volume herein, the aperture 338 is assumed to be removed from the back wall 336 and an imaginary continuous back wall 336 or substantially planar back wall is utilized to calculate the cavity volume.

In some embodiments, the filler material 324 occupies about 50% to about 99% of the total club head cavity volume while the plug 320 occupies between about 0% to about 20% of the total cavity volume. In specific embodiments, the plug 320 occupies between about 0.1 cc and 1 cc with the remainder of the cavity volume being filled by the filler material 324. It is understood that any of the embodiments described herein can be provided without a plug and filler material only.

In order to achieve a desirable CG location, the filler material 324 and plug 320 must be lightweight. In certain embodiments, the total mass of the filler material 324 and plug 320 is less than about 5 g or between about 2 g and about 4 g. In one embodiment, the total weight of the filler material 324 and the plug 320 is 10 g or less, or about 3 g or less. In certain embodiments, the total weight of the filler material 324 and plug 320 is less than 2% of the total weight of the club head 300 (excluding any badges, filler material/plug, and ferrule ring). In other embodiments, the total weight of the filler material 324 and plug 320 is less than about 10% of the total weight of the club head 300.

Table 8, shows exemplary golf club heads and the respective weight ratios between the filler material 324 and plug 320 and the total club head weight 300, as described above.

EXAMPLE 8

TABLE 8

| Club head | Total Weight of Filler Mat. And Plug (g) | Total Weight of Club Head (g) | Weight Ratio (%) |
|---|---|---|---|
| 3-iron | 3.7 | 229.9 | 1.6 |
| 4-iron | 3.6 | 236.1 | 1.5 |
| 5-iron | 3.6 | 242.1 | 1.5 |
| 6-iron | 3.5 | 248.5 | 1.4 |

As shown in Table 8, the total weight of the filler material 324 and plug 320 is between about 1% and about 5% of the total weight of the club head (excluding the badges, filler material/plug, and ferrule ring). Thus, a desirable CG location is still attainable while improving the sound and feel of the golf club head. In certain embodiments, the plug 320 can weigh about 0.5 g to about 1 g and the filler material can weigh about 5 grams or less. In some embodiments, the plug 320 weights about 0.7 g or less. In other embodiments, the plug 320 can be equal to or heavier than the total filler material weight.

In yet other embodiments, the filler material 324 and the plug 320 have a combined weight of less than 20% of the total club head weight (excluding badges, filler material/plug, and ferrule ring). In one embodiment, the combined weight of the filler material 324 and plug 320 is less than 5%.

Figure 4:
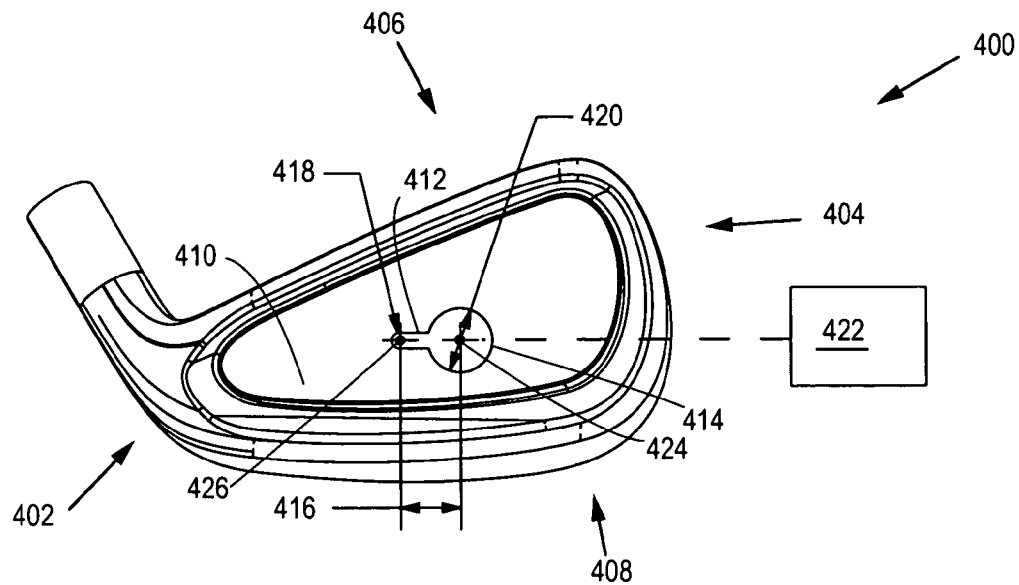
FIG. 4 is a rear view of a golf club head according to an embodiment.

FIG. 4 illustrates a rear view of an exemplary embodiment of a golf club head 400 including a heel portion 402, a toe portion 404, a top line portion 406, a sole portion 408, and a back wall 410. FIG. 4 further shows an aperture 414 having an aperture diameter 420 of about 10 mm to about 15 mm, or less than 30 mm. The aperture 414 is connected with a slot 412 that extends away from the aperture 414 in a horizontal direction toward the heel portion 402. The aperture 414 has an opening at the slot connection portion and is configured to allow a plug 422 to move from a first position to a second position.

It is understood that the slot 412 could extend in the opposite horizontal direction toward the toe region 404 or in any direction needed. The slot includes a rounded end portion 418 having a diameter between about 2 mm to 5 mm, or preferably about 3 mm.

A sliding distance 416 defines the distance between a first center point 424 of the aperture 414 to a second center point 426 of the rounded end portion 418. In certain embodiments, the sliding distance 416 is between about 1 mm and 70 mm, or between about 5 mm and about 15 mm. In one embodiment, the sliding distance 416 is about 11 mm, the aperture diameter is about 12 mm, and the rounded end portion 418 of the slot 412 is about 3 mm.

A plug 422 is initially inserted into the aperture 414 and then moved by an amount equal to the sliding distance 416. A portion of the plug 422 is keyed to the slot 412 and thereby restricts the movement of the plug 422 in a sole 408 to top line 406 direction.

Figure 5A:
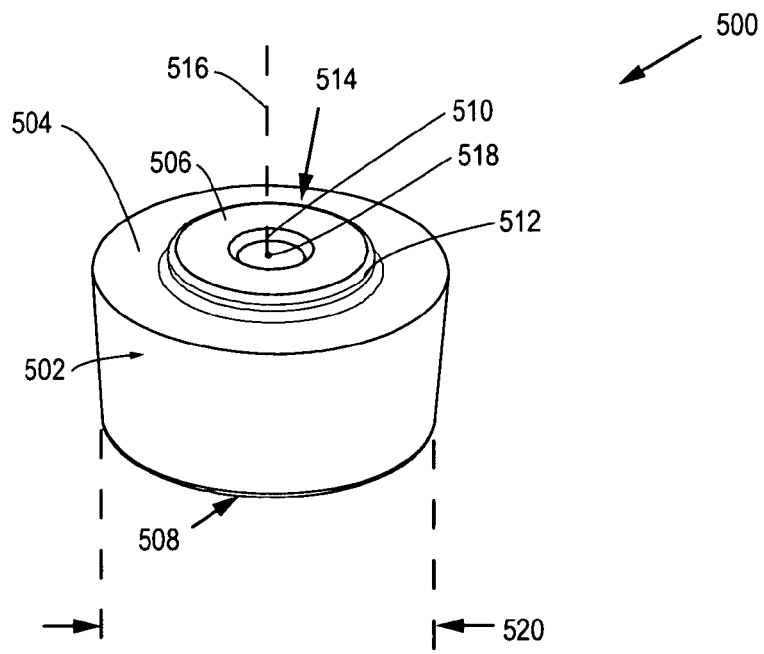
FIG. 5A is an isometric view of a golf club head insert.

FIG. 5A illustrates an exemplary embodiment of a plug 500. The plug 500 has an overall cylindrical shape having a first surface (or side wall) 502, a second surface (or bottom surface) 508, and a third surface (or top surface) 514. In one embodiment, the side wall 502 is the continuous, curved, and circular wall of the cylindrical shaped plug 500. The top surface 514 includes an engagement surface 504 and a keying portion 506 that is elevated above the engagement surface 504. The keying portion 506 includes a raised side engagement wall 512 forming the keying portion 506 and a recessed center portion 510. In some embodiments, the center portion 510 can be used for engagement with an applicator during the insertion and movement of the plug 500. The tip of an applicator can be inserted into the recessed center portion 510.

The keying portion 506 includes a center point 518 which is located along a central axis 516 of the cylindrical shaped plug 500. When the plug 500 is inserted into the aperture 414, the overall diameter 520 of the side wall 502 of the cylindrical plug 500 is less than the diameter 420 of the aperture 414 to allow easy insertion of the plug 500. Once the bottom surface 508 of the plug 500 engages a rear surface of the striking plate, the plug 500 can be moved a sliding distance 416 from a first position to a second position. The first position is characterized by the central axis 516 of the plug 500 being aligned with the first center point 424 of the aperture 414 across a plane parallel to the back wall 410. The second position is characterized by the central axis 516 of the plug 500 being aligned with the second center point 426 of the rounded portion 418 of the slot 412. It is understood that the plug 500 is not limited to cylindrical shapes and can be cubical, rectangular, elliptical, spherical, egg shaped, pyramidal, tapered, trapezoidal, or any known three dimensional shape.

In certain embodiments, the keying portion 506 and raised side engagement wall 512 can be eliminated, thus relying purely on the compression of the plug to hold it in place.

When the plug 500 is moved to the second position or the engaged position, the plug 500 is slightly compressed between the rear wall of the striking plate and the back wall 410. In the second position, the engagement surface 504 of the plug 500 engages the interior wall of the back wall 410. The raised side engagement wall 512 of the keying portion 506 engages side walls of the slot 412 to prevent significant movement of the plug in at least a sole-to-top line direction. It is understood that frictional engagement between the plug 500 and the back wall 410 will also reduce the amount of movement of the plug in a heel-to-toe direction, even before a filler material is introduced.

Figure 5B:
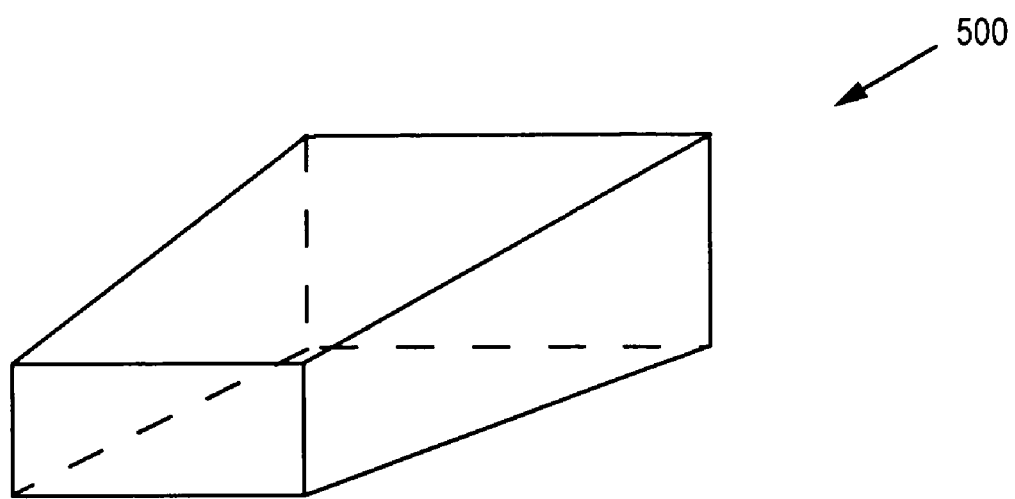
FIG. 5B is an isometric vie of a golf club head insert.

FIG. 5B illustrates another exemplary plug 522 of a general wedge shape. The wedge shaped plug 522 is configured to be compressed between the rear wall of the striking plate and the back wall. A side view of the plug 522 shows a generally trapezoidal shape. The aperture 414 can be any shape including a rectangular or trapezoidal shape to accommodate the shape of the plug 522. The wedge shaped plug 522 is inserted into the aperture 414 and moved to a wedge position as previously described.

Figure 6A:
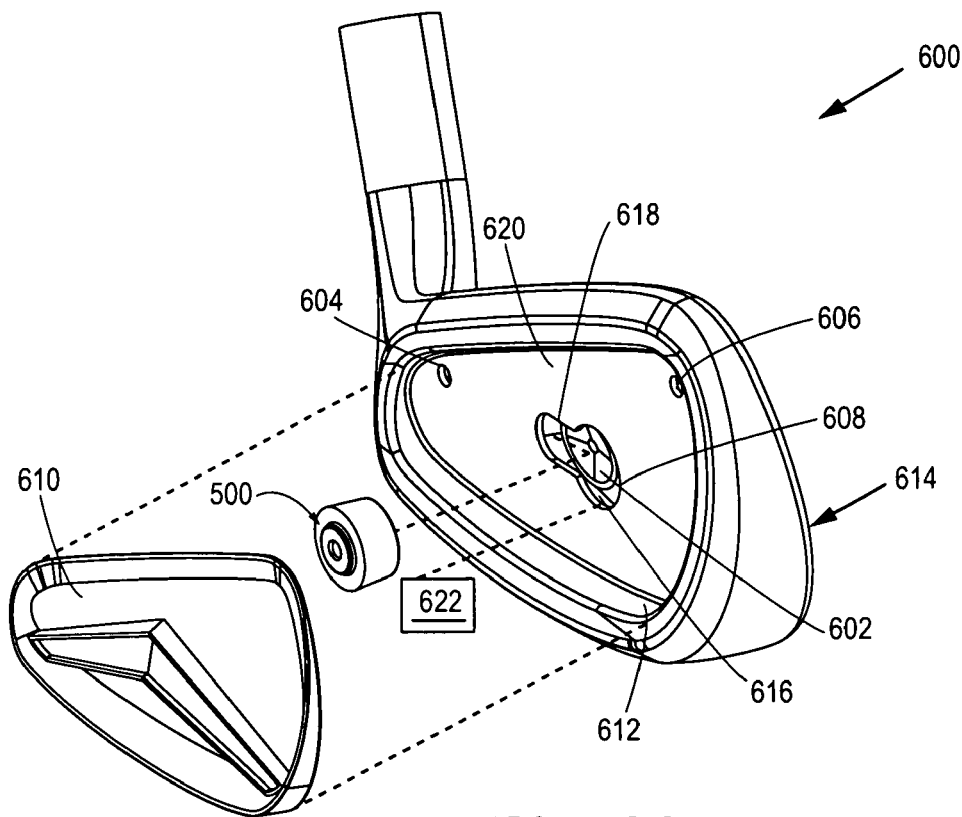
FIG. 6A illustrates an exploded assembly view of a golf club head according to an embodiment.

FIG. 6A illustrates an exploded assembly of an exemplary club head 600 embodiment utilizing a plug 500 and filler material 622, as previously described. The club head 600 includes a striking face 614, an interior rear striking face surface 616, an inverted cone or thickened central region 602, an aperture 608, a slot 618, a back wall surface 620, a recess 612, and a badge 610.

FIG. 6A further illustrates a heel side vent hole 604 and a toe side vent hole 606 located in the back wall surface 620. The vent holes 604,606 enables air to escape the interior cavity during the expansion process of the filler material 622 or expanding foam.

Figure 6B:
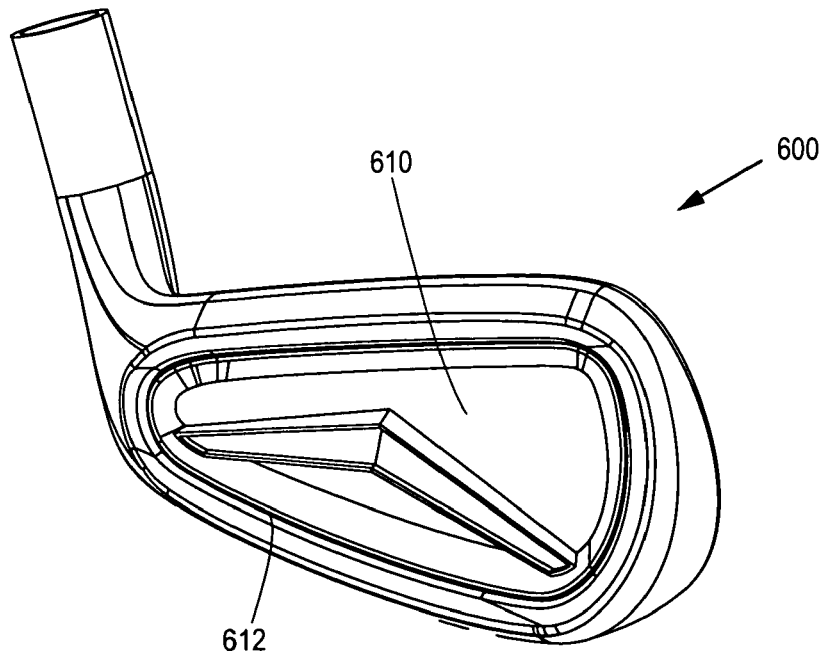
FIG. 6B illustrates an assembled view of a golf club head according to an embodiment.

FIG. 6B illustrates a fully assembled club head after the plug 500 and filler material 622 have been inserted into the interior cavity of the club head 600. The badge 610 is inserted into the recess 612 and covers the entire back wall surface 620 while obscuring the aperture 608, slot 618, plug 500, and vent holes 604,606.

Figure 7:
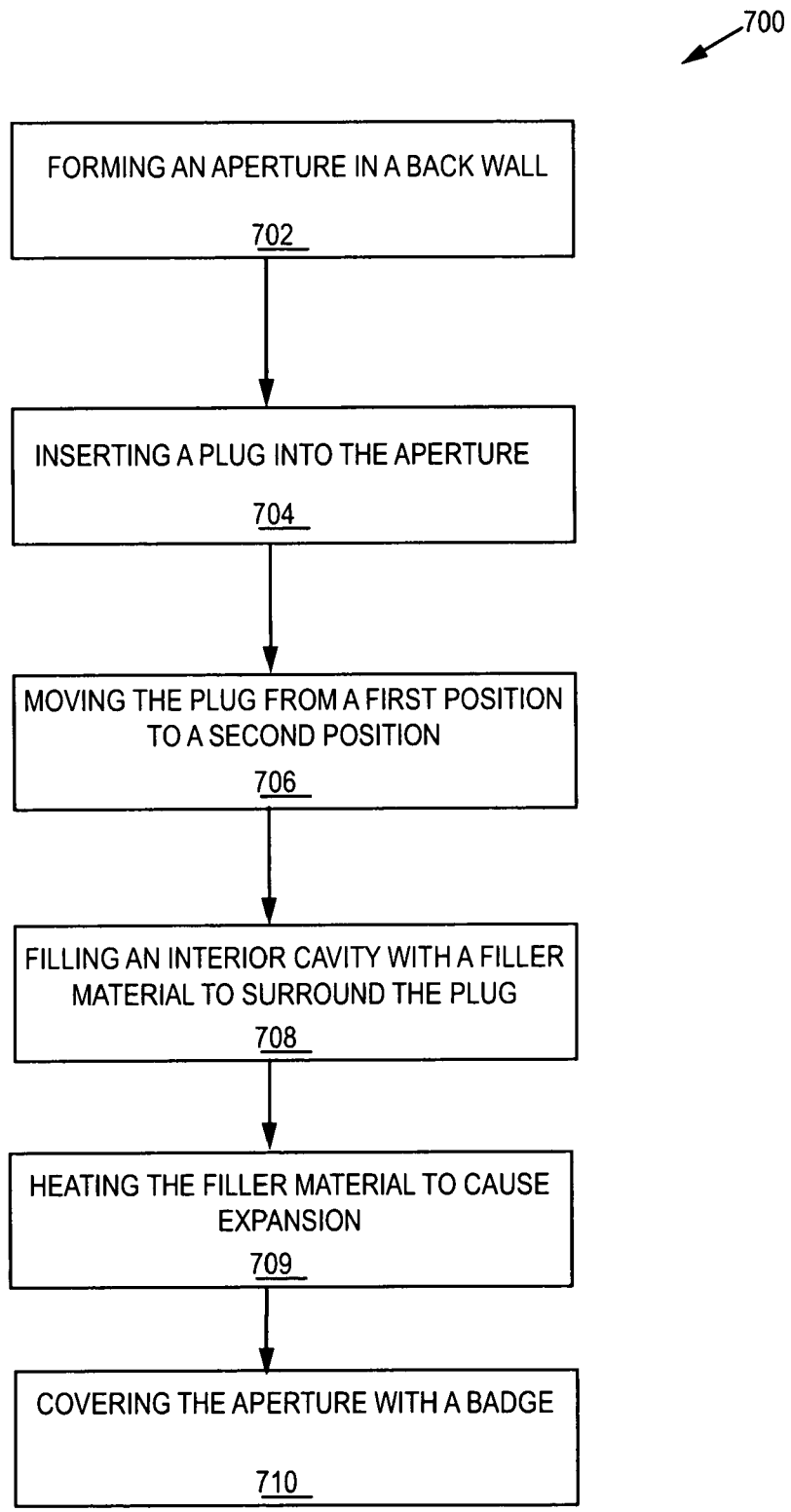
FIG. 7 illustrates a flow chart of a golf assembly operation.

FIG. 7 illustrates a series of operations 700 that are accomplished in inserting a plug into an interior cavity of a club head. Initially, a weld is placed on the face of an iron-type golf club to attach a striking plate. A weld bead likely occurs on the front face portion and within a rear cavity portion of the golf club head. If the striking plate is cast instead of welded, a weld operation on the face of the club head is not required.

In a first operation 702, an aperture is formed in the back wall of a hollow iron. The aperture can be created through machining or casting or other manufacturing processes. A plug, as described above, is then inserted into the aperture in a second operation 704 so that the plug is primarily located within an interior cavity of the club head.

In a third operation 706, the plug is moved from a first position to a second position so that the plug is relatively secured in place in the second position. Once the plug is moved to the second position, a filler material is introduced, in a fourth operation 708, into the cavity interior to provide sound and vibration dampening and to hold the plug securely in the second position by surrounding the plug. In a fifth operation 709, the filler material is heated to cause expansion within the interior cavity and completely filling the remaining cavity volume surrounding the plug. In a sixth operation 710, a badge is attached to a rear portion of the club head to cover or occlude the aperture. It is understood that the heating operation 709 can be excluding in embodiments utilizing non-expanding foam such as injection foam, urethane, two part foam, or chemical initiated expansion foam.

At least one advantage of the embodiments described is that sound is dampened upon impact with a golf ball while maintaining a hollow iron construction.

At least another advantage of the embodiments described is that unwanted vibrations can be absorbed by the filler material and plug so that a golfer perceives a softer feel upon impact with the ball.

Figure 8:
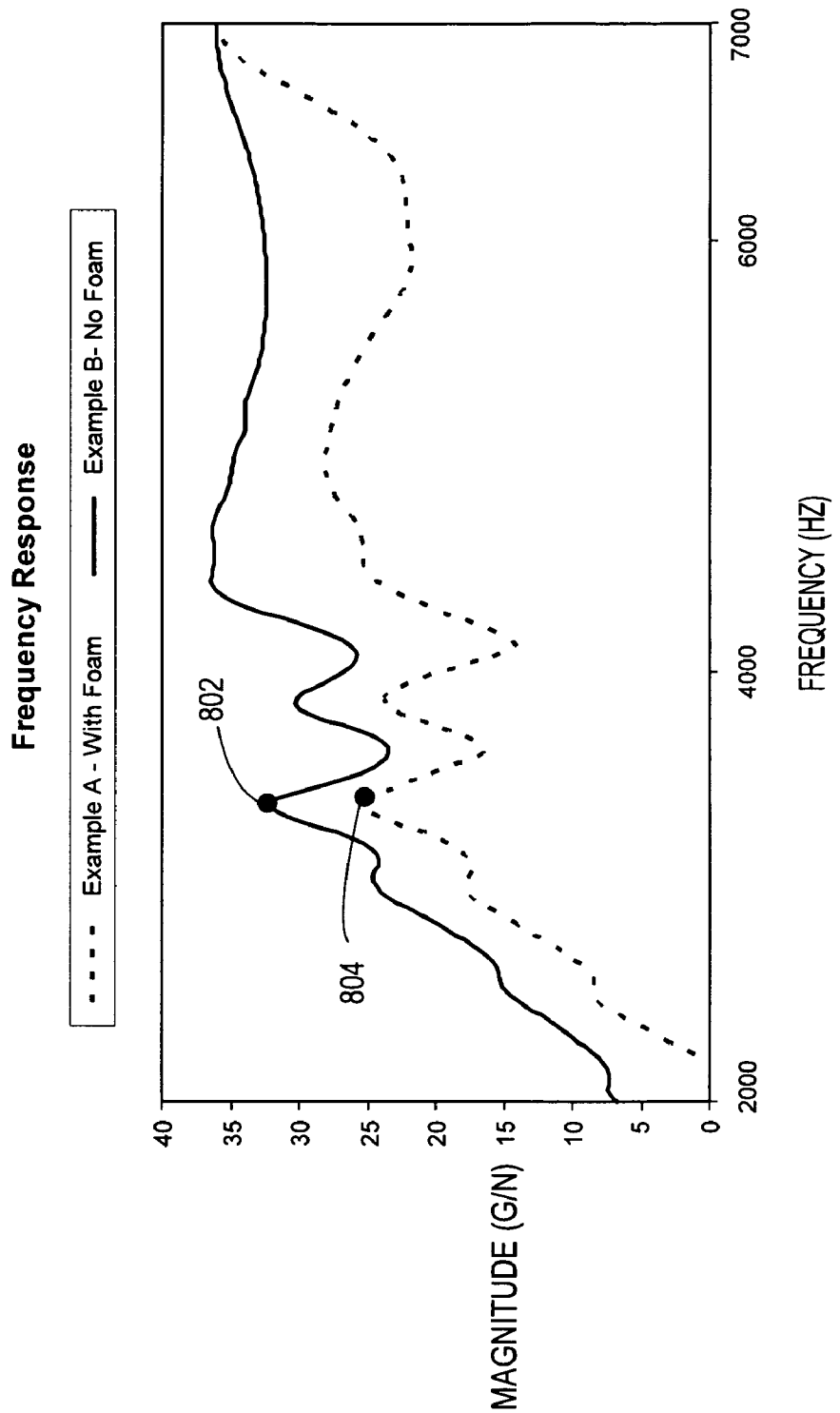
FIG. 8 illustrates a graph of a frequency response of exemplary golf club heads.

FIG. 8 illustrates the frequency response function of two example golf club heads. Examples A and B are similar in construction to the embodiment shown in FIGS. 6A and 6B. Each example was impacted at center face with a hammer to observe an individual frequency response.

Example B did not include any filler material or plug within the interior cavity (hereinafter, "unfilled example"). Example A includes the plug and surrounding filler material, as described above (hereinafter, "filled example"). As shown in FIG. 8, the first mode frequency response peak 802 of the unfilled example B is noticeably higher in comparison to the first mode frequency response peaks 804 of the filled example A. Therefore, the acceleration of the unfilled example B is higher than the magnitude or amplitude of accelerance of the filled example A. Thus, the filler material or expanding foam significantly dampens the accelerance amplitude of the filled example A to less than about 30 G/N (which is acceleration/input force). The accelerance amplitude describes the structure's acceleration relative to the input force as a function of frequency. In certain embodiments, an accelerance reduction of between about 5% to about 50% between the first mode frequency responses 802,804 of the unfilled example and filled example is achieved.

At least another advantage of the embodiments described is that a lightweight filler material arrangement is created allowing the center of gravity of the hollow iron construction to remain low while improving the sound and feel of the club during use.

The embodiments described herein conform with the USGA (United States Golf Association) Rules of Golf and Appendix II, 5c related to the Determination of Groove Conformance (issued in August 2008). For example, clubs having a loft of 25 degrees or higher meets the groove width, groove depth, groove separation, groove consistency, area limitations, and edge radius requirements set forth by the USGA. In the embodiments described herein, less than 50% of measured values of Area/(Width+Separation) are greater than 0.0030 in$^2$/in and no single measured value of Area/(Width+Separation) value for any single groove is greater than 0.0032 in$^2$/in.

With respect to a groove edge radius, the groove edges are in the form of a radius conforming with the USGA Rules of Golf as described by the two circles method. In addition, the effective radius is not greater than 0.020". In the embodiments described, less than 50% of the upper groove edges or lower groove edges fails the two circles method subject to a 10 degree angular allowance as described in the USGA rules. No single groove edge protrudes more than 0.0003" outside the outer circle.

In view of the many possible embodiments to which the principles of the disclosed invention may be applied, it should be recognized that the illustrated embodiments are only preferred examples of the invention and should not be taken as limiting the scope of the invention. It will be evident that various modifications may be made thereto without departing from the broader spirit and scope of the invention as set forth. The specification and drawings are, accordingly, to be regarded in an illustrative sense rather than a restrictive sense.

We claim:

1. A hollow iron-type golf club head comprising: a heel portion, a sole portion, a toe portion, a top-line portion, a front portion, a rear portion, and a striking face; a back wall in the rear portion enclosing a substantial portion of the rear portion to create a substantially enclosed cavity, the enclosed cavity being defined by at least a rear surface of the striking face, an inner back wall surface, and the sole portion; at least one plug and a filler material located within the enclosed cavity, the filler material substantially surrounding the at least one plug and being configured to hold the at least one plug in place, wherein the filler material occupies about 50% to about 99% of the total club head cavity volume in the enclosed cavity and wherein the filler material and the at least one plug have a combined weight of less than about 10 g.

2. The iron-type golf club head of claim 1, wherein the enclosed cavity has a volume between about 1 cc and 200 cc.

3. The iron-type golf club head of claim 2, wherein an unsupported face area is between about 300 mm$^2$ to about 4,000 mm$^2$.

4. The iron-type golf club head of claim 3, wherein the unsupported face area includes a thickened central region.

5. The iron-type golf club head of claim 4, wherein the at least one plug is positioned to be in contact with at least a portion of the thickened central region.

6. The iron-type golf club head of claim 5, wherein the at least one plug contacts the inner back wall surface.

7. The iron-type golf club head of claim 1, wherein the striking face includes a welded striking plate.

8. The iron-type golf club head of claim 1, wherein a total striking face area is between about 2,700 mm$^2$ and about 5,000 mm$^2$.

9. The iron-type golf club head of claim 1, further comprising an aperture into the enclosed cavity, the aperture being configured to allow the cavity to be filled with the filler material.

10. The iron-type golf club head of claim 9, wherein the filler material is an expanding foam material having a density between about 0.03 g/cc and about 0.19 g/cc.

11. The iron-type golf club head of claim 1, wherein the filler material occupies about 50% to about 99% of the total club head cavity volume in the enclosed cavity.

12. The iron-type golf club head of claim 1, wherein the filler material completely fills a remaining cavity volume around the at least one plug.

13. The iron-type golf club head of claim 1, wherein the filler material contacts an entire first side surface of the at least one plug.

14. The iron-type golf club head of claim 1, wherein the filler material and the at least one plug have a combined weight of less than about 5 g.

15. The iron-type golf club head of claim 1, wherein the back wall includes a first aperture.

16. The iron-type golf club head of claim 1, wherein the back wall includes a first aperture having at least a first diameter and a slot configured to match at least a keying portion of the at least one plug.

17. The iron-type golf club head of claim 1, wherein the coefficient of restitution of the club is greater than about 0.8.

18. The iron-type golf club head of claim 1, wherein the striking face includes a striking plate formed of a steel selected from the group consisting of maraging steels, maraging stainless steels, and PH stainless steels.

19. The iron-type golf club head of claim 1, wherein at least a portion of the at least one plug is in direct contact with a rear surface of the striking face and at least a portion of the filler material is in direct contact with a rear surface of the striking face.

20. The iron-type golf club head of claim 1, wherein the back wall includes at least a first aperture, the first aperture being configured to allow the at least one plug to be inserted into the first aperture and is configured to allow the at least one plug to move from a first position to a second position.

21. The club head of claim 20, wherein the back wall includes at least one slot, the at least one slot being connected to the first aperture and is configured to secure the at least one plug.

22. A hollow iron-type golf club head comprising: a heel portion, a sole portion, a toe portion, a top-line portion, a front portion, a rear portion, and a striking face; a back wall in the rear portion enclosing a substantial portion of the rear portion to create a substantially enclosed cavity, the enclosed cavity being defined by at least a rear surface of the striking face, an inner back wall surface, and the sole portion; at least one plug and a filler material located within the enclosed cavity, the filler material substantially surrounding the at least one plug and being configured to hold the at least one plug in place, wherein the filler material occupies about 50% to about 99% of the total club head cavity volume in the enclosed cavity and wherein the filler material and the at least one plug have a combined weight of less than about 20% of the total club head weight.

23. The iron-type golf club head of claim 22, wherein the filler material and the at least one plug have a combined weight of less than about 5% of the total club head weight.

* * * * *